United States Patent Office 3,076,762
Patented Feb. 5, 1963

3,076,762
ACIDIZING OF WELLS
Walter R. Dill, Duncan, Okla., assignor to Halliburton Company, a corporation of Delaware
No Drawing. Filed June 20, 1960, Ser. No. 37,091
9 Claims. (Cl. 252—8.55)

This invention relates generally to the acidizing of wells and, more particularly, to an acidizing fluid and a well treating method using the same, and to an agent or additive for inclusion in the acidizing fluid to control or influence the rate of reaction between the acid therein and certain substances encountered in the well.

It is anticipated that the invention will be most widely applied in connection with well acidizing operations wherein it is desired to utilize a retarded or relatively slow reacting acid. In certain wells, particularly those wherein limestone is encountered, attempts to treat the wells with conventional acidizing fluids have not always been successful, due to the tendency of the acid to react relatively rapidly with the limestone and thus become prematurely spent without penetrating adequately into the treated zone or formation.

While various slow-reacting or retarded acidizing fluids have heretofore been proposed, difficulties have commonly been encountered, particularly in that certain proposals have involved using thickened, gelled or emulsified fluids which generally do not penetrate as readily into the treated zone or formation as do thinner or low viscosity fluids.

One object of the present invention is to provide an improved slow-reacting or retarded acidizing fluid of relatively low viscosity.

A more general object of the invention is to provide an improved acidizing fluid and an improved well treating method using the same.

Another object of the invention is to provide an improved retarding agent for inclusion in or addition to an acidizing fluid to be used in treating wells wherein limestone or other substances are present which tend to react relatively rapidly with the acid.

A further object of the invention is to provide an improved retarded, thin acidizing fluid and an improved well treating method using the same.

The foregoing and additional objects and advantages are attained, in accordance with the invention, by utilizing carbon dioxide as retarding agent in the acidizing fluid.

In one way of proceeding, solidified carbon dioxide or Dry Ice is included in or added to an acidizing fluid prepared using 15% aqueous hydrochloric acid solution. It is understood that a more concentrated or weaker acid solution may be used, if desired.

It is preferred that the Dry Ice be first reduced to particulated form, such as by grinding the large chunks or solid pieces into particles of smaller size. One reason for this is to enable a more uniform dispersion or mixture to be obtained when the carbon dioxide is combined with the acid solution.

If desired, the Dry Ice particles may be combined with the acidizing fluid as it is being pumped or otherwise introduced into the well. To this end, a proportioning and mixing device may be advantageously employed. Conventional devices of the type suited for this purpose are well known and widely used in the oil fields and, accordingly, it is believed unnecessary to describe their operation in detail.

Where other agents or ingredients are to be included, these may be added at convenient times, in accordance with conventional practices.

While the invention is not limited to any particular theory of behavior, it is believed that the Dry Ice particles, to the extent that they remain in solid form, should be allowed or caused to enter with the acid solution into the pore spaces and other openings of the well strata, in order that the cooling effect will remain and extend into the treated zone or formation as far as possible. To this end, it is preferred that the particle sizes of the Dry Ice be sufficiently small to permit at least appreciable quantities thereof to be injected with the acid solution and pass through the fluid passageways present or created in the treated zone or formation.

It will be appreciated by those skilled in the art that particles which are too large to enter the formation openings will tend to temporarily clog or plug the entrances thereto and thus will tend to cause the acidizing fluid to enter other openings which are not obstructed. While this may be desirable in certain instances, such as where the formation includes several zones of varying permeabilities and it is desired to preferentially treat the less permeable zones, it is believed that smaller particles of Dry Ice will ordinarily be preferred.

As one alternative to using Dry Ice particles, the carbon dioxide may be added in liquid form to the acidizing fluid. As another alternative, it may be advantageous in some instances to use carbon dioxide gas, such as from bottles or other containers where the gas is kept under pressure until used.

As alternatives to using hydrochloric acid in preparing the acidizing fluid, any of various other acids or mixtures of acids may be employed. Examples are sulfamic acid, nitric acid and acetic acid.

In carrying out a treating or acidizing operation, the acidizing fluid containing the carbon dioxide may be pumped downwardly into the well and then caused or allowed to contact the zone or formation to be treated. Well packers may be advantageously employed at one or both locations above and below the zone or formation, in order to confine the acidizing fluid at the desired location and, if desired, to facilitate the application of pressure to the acidizing fluid to cause it to enter the zone or formation more readily.

After injection of the acidizing fluid into the well and possibly at least a portion thereof into the adjacent strata, the well may be closed in to permit gas pressure to build up in the well. Some gas pressure is released when the critical temperature of the carbon dioxide is reached. This is in addition to the gas pressure resulting from the reaction of the acid solution with the limestone in the well. Thus, the use of carbon dioxide results in the application of additional pressure which tends to displace the acidizing fluid into and along the fluid passageways extending into the well strata.

In accordance with the present invention, it is possible to obtain increased penetration of the acidizing fluid into the well strata, due in part to the gas pressure which builds up in the well, as aforesaid, and due also to the relatively low viscosity of the fluid, as compared to the thickened, gelled or emulsified fluids of the prior art. At the same time, the dissolving of carbon dioxide in the acidizing fluid results in the production of carbonic acid which itself is capable of functioning as an acidizing medium. The concentration of carbonic acid increases as the fluid cools and as the pressure increases. This carbonic acid assists the hydrochloric acid in quantitatively reacting upon acid soluble material. Also, as the carbonic acid is produced, it changes the equilibrium point of the hydrochloric acid-carbonate reaction to accomplish a retarding effect. Furthermore, since the carbon dioxide is a refrigerant when used in Dry Ice or liquid form, or when released as a gas from a high pressure container, the resulting cooling effect additionally retards the reaction rate of the acidizing fluid on substances such as limestone with which the acid would otherwise react so rapidly as to become prematurely spent.

While the invention has been described herein with particular reference to its application to thin acidizing fluids, it will be appreciated by those skilled in the art that the gaseous, liquid or solidified carbon dioxide may also be employed as an additive in thickened, gelled or emulsified acidizing fluids, if otherwise compatible therewith, but in these applications the additional advantages due to employing a low viscosity fluid will not be obtained. It is believed that a retarded, thin acidizing fluid is particularly important where it is desirable for the fluid to penetrate readily for considerable distances into the treated zone or formation prior to the acid becoming spent.

What is claimed as the invention is:

1. An acidizing fluid consisting essentially of: a well treating acid of the type used in acidizing wells to increase the production thereof and solid carbon dioxide.

2. An acidizing fluid consisting essentially of: a well treating acid selected from the group consisting of hydrochloric acid, nitric acid, acetic acid, sulfamic acid and mixtures thereof; and particulated solid carbon dioxide.

3. An acidizing fluid consisting essentially of: hydrochloric acid and particulated solid carbon dioxide.

4. In a well acidizing operation, the step of: introducing into the well an acidizing fluid comprising a well treating acid selected from the group consisting of hydrochloric acid, nitric acid, acetic acid, sulfamic acid and mixtures thereof, and particulated solid carbon dioxide.

5. In a well acidizing operation, the step of: introducing into the well and acidizing fluid comprising hydrochloric acid and particulated solid carbon dioxide.

6. A method of acidizing limestone and other earthen formations, comprising the steps of:
   (a) dispersing a quantity of carbon dioxide, in the form selected from the group consisting of solid carbon dioxide and liquid carbon dioxide, into a well treating acid of the type used in acidizing wells to increase the production thereof, whereby a retarded acidizing fluid is obtained; and,
   (b) introducing the acidizing fluid comprising said acid and said dispersed form of carbon dioxide into a well bore for acidizing the earthen formation therein.

7. A method of acidizing limestone and other earthen formations, comprising the steps of:
   (a) dispersing a quantity of carbon dioxide, in the form selected from the group consisting of solid carbon dioxide and liquid carbon dioxide, into a well treating acid, selected from the group consisting of hydrochloric acid, nitric acid, acetic acid, sulfamic acid and mixtures thereof, whereby a retarded acidizing fluid is obtained; and,
   (b) introducing the acidizing fluid comprising said acid and said dispersed form of carbon dioxide into a well bore for acidizing the earthen formation therein.

8. A method of acidizing limestone and other earthen formations, comprising the steps of:
   (a) grinding solid pieces of carbon dioxide or Dry Ice into particles of a sufficiently small size, whereby a substantially uniform dispersion may be obtained when said particles of carbon dioxide are combined with a well treating acid;
   (b) mixing the finely ground particles of carbon dioxide with a well treating acid selected from the group consisting of hydrochloric acid, nitric acid, acetic acid, sulfamic acid and mixtures thereof, thereby forming the well treating fluid;
   (c) introducing said well treating fluid containing the particles of solid carbon dioxide into the well to be treated; and
   (d) directing the placement of said well treating fluid into the earthen formation to be treated.

9. A method of acidizing limestone and other earthen formations, comprising the steps of:
   (a) grinding solid pieces of carbon dioxide or Dry Ice into particles of a sufficiently small size, whereby a substantially uniform dispersion may be obtained when said particles of carbon dioxide are combined with a well treating acid;
   (b) mixing the finely ground particles of carbon dioxide with a well treating acid selected from the group consisting of hydrochloric acid, nitric acid, acetic acid, sulfamic acid and mixtures thereof, thereby forming the well treating fluid;
   (c) introducing said well treating fluid containing the particles of solid carbon dioxide into the well to be treated;
   (d) directing the placement of said well treating fluid into the earthen formation to be treated; and
   (e) closing the well in for a sufficient period of time to enable gas pressure to be built up in the well, thereby tending to force the well treating fluid into and along the fluid passageways extending into the earthen formation.

References Cited in the file of this patent
UNITED STATES PATENTS

| | | |
|---|---|---|
| 2,050,933 | De Groote | Aug. 11, 1936 |
| 2,053,285 | Grebe | Sept. 8, 1936 |

OTHER REFERENCES

Kingston: Acidizing Handbook, 1947, Gulf Publ. Co., Houston, Texas, pp. 21 to 26, 47 and 48.